United States Patent [19]

Johnson

[11] Patent Number: 4,640,305
[45] Date of Patent: Feb. 3, 1987

[54] HIGH TEMPERATURE, ZERO LEAKAGE PACKING ASSEMBLY

[75] Inventor: Roger E. Johnson, Girard, Pa.

[73] Assignee: White Consolidated Industries, Inc., Cleveland, Ohio

[21] Appl. No.: 671,477

[22] Filed: Nov. 14, 1984

[51] Int. Cl.⁴ .......................... F16K 41/02; F16J 15/40
[52] U.S. Cl. ..................................... 137/312; 137/315; 251/214; 277/23; 277/24; 277/27; 277/50; 277/59; 277/60; 277/105; 277/135
[58] Field of Search .............. 137/312, 315; 251/214, 251/368; 277/23, 24, 50, 58, 59, 60, 105, 106, 110, 112, 135, 27

[56] References Cited

U.S. PATENT DOCUMENTS

| | | | |
|---|---|---|---|
| 1,582,786 | 4/1926 | Rhodes | 277/60 |
| 1,700,894 | 2/1929 | Joyce et al. | 277/24 |
| 2,544,537 | 3/1951 | Levy | 277/59 |
| 2,776,173 | 1/1957 | Rudy | 277/24 UX |
| 2,818,286 | 12/1957 | Harney | 277/60 |
| 2,920,643 | 1/1960 | Terrett | 251/214 |
| 3,131,938 | 5/1964 | Barry | 277/9 |
| 3,319,647 | 5/1967 | Morain | 277/59 |
| 3,643,964 | 2/1972 | Snelling et al. | 277/24 |
| 3,939,910 | 2/1976 | Bruce | 277/59 |
| 3,951,419 | 4/1976 | Abrahams et al. | 277/135 |
| 4,055,107 | 10/1977 | Bartley | 277/24 |
| 4,061,157 | 12/1977 | Hanssen | 137/242 |
| 4,094,512 | 6/1978 | Back | 277/27 |
| 4,166,606 | 9/1979 | Kawolics et al. | 277/58 |
| 4,425,838 | 1/1984 | Pippert | 92/86 |

FOREIGN PATENT DOCUMENTS

| | | | |
|---|---|---|---|
| 817426 | 7/1959 | United Kingdom | 251/214 |
| 2055160 | 2/1981 | United Kingdom | 277/105 |

Primary Examiner—George L. Walton
Attorney, Agent, or Firm—Mandeville & Schweitzer

[57] ABSTRACT

The disclosure is related to a high temperature, zero leakage packing assembly for use in connection with the valve stem of a high pressure control valve. The packing assembly is particularly suitable for use in the control of high temperature, high pressure fluids containing corrosive materials, such as molten salt. The packing assembly generally comprises a bushing arrangement forming the lowermost portion of the assembly and a plurality of series arranged, axially stacked sealing barriers mounted above the lowermost bushing element. In accordance with a specific feature of the invention, the lowermost bushing element comprises a heat and corrosion resistant material and is formed to include an internal fluid chamber arranged to provide a fluid reservoir around the valve stem. Pursuant to an additional embodiment of the invention, a cartridge element is arranged and configured to house and enclose the sealing barriers, whereby the cartridge element and enclosed sealing barriers comprise an integral unit.

16 Claims, 2 Drawing Figures

HIGH TEMPERATURE, ZERO LEAKAGE PACKING ASSEMBLY

BACKGROUND AND SUMMARY OF THE INVENTION

The present invention is directed to a high temperature, zero leakage packing assembly for use in connection with the valve stem of a high pressure control valve. The invention is particularly suitable for use in the control of high temperature, high pressure fluids containing corrosive materials, such as molten salt.

In accordance with a well known design for a high pressure fluid control valve, a valve plug is selectively matable with a valve seat formed within the internal flow path of a valve body to open and close fluid flow through the valve. Typically, the valve plug is controlled to move through a predetermined work stroke by a valve stem. The valve stem extends through an opening formed in the valve body to an actuator mechanism, whereby the valve plug may be selectively controlled to operate the valve. Of course, it is necessary, in the conventional design, to provide a sealing means to form a leak tight seal between the valve stem and the valve body opening to prevent fluid leakage around the stem.

An example of a widely used sealing means consists of a plurality of ring-shaped packing elements arranged in an axial stack and received over the valve stem. The ring seals are dimensioned to be in a snug fit between the stem and inner diameter of the valve body opening through which the stem extends. In this manner, the axial stack of elements provides a leak-tight fit between the stem and body while accommodating axial displacement of the stem to control the valve plug. While the prior art arrangement is generally effective as a seal, the ring elements are subject to erosion and breakdown when the fluid passing through the valve contains corrosive materials. When, for example, the fluid is under high pressure and contains a molten salt, the high pressure effect of the fluid will constantly place the corrosive salt against the ring elements, whereby the ring elements are gradually eroded away until the elements are no longer effective as a seal. At such time, the valve must be repaired, thereby significantly interfering with the on-line work life of the valve and increasing the maintenance costs associated with the valve.

It is a primary objective of the present invention to provide a new and improved stem seal arrangement which is resistant to erosion and highly convenient to repair and/or replace with minimal valve down time. Generally, the seal of the invention comprises a plurality of sealing components arranged to provide a series of sealing barriers and to impede and minimize the exposure of the sealing barriers to the corrosive contents of the fluid flow. The sealing arrangement includes a lowermost bushing and an uppermost safety bushing arranged in an axially spaced relation with respect to one another and securing therebetween a series of packing ring elements. The bushings and ring elements are each in an annular configuration to conveniently fit in a leak tight relation between the valve stem and valve body opening. Each of the bushings is provided with fluid seal elements to form first and last fluid sealing barriers, while the series of packing elements form several intermediate fluid sealing barriers therebetween.

Pursuant to an important feature of the invention, the lowermost bushing comprises an erosion resistant material, such as stainless steel, and includes an internal fluid chamber. The bushing itself will act to substantially impede fluid leakage. Moreover, any minimal fluid leakage that does occur between the bushing and stem will pass into the internal fluid chamber, whereby, as will be discussed in greater detail below, at least a portion of the corrosive contents of the fluid may precipitate out of the fluid and accumulate in the chamber away from the sealing barriers. Accordingly, the exposure of the sealing barriers to the fluid and its corrosive contents will be minimized to greatly extend the sealing arrangement's worklife. In addition, the use of several sealing barriers will further extend the worklife of the arrangement inasmuch as the fluid will be contained so long as at least one of the barriers remains effective. The series arrangement of the several barriers insures that only one barrier at a time will be eroded away.

In accordance with a significant feature of a preferred embodiment of the invention, the topmost seal of the upper bushing is a pressure activated safety seal. If and when the fluid erodes all of the lower sealing barriers, the fluid pressure will reach the safety seal, whereby the seal will be activated to prevent leakage. Moreover, the safety seal is arranged in a recess formed immediately below the gland follower securing the sealing arrangement. In this manner, the safety seal is easily accessible for replacement. Thus, in the event that the safety seal starts to leak, the valve may be immediately, temporarily repaired by exposing and replacing the safety seal.

Pursuant to a feature of a further embodiment of the invention, the entire seal arrangement is mounted within a removable cartridge. Therefore, the entire sealing assembly of the invention may be conveniently replaced simply by removing a used cartridge from the valve body and inserting a new cartridge in its place. Of course, each cartridge will contain the upper and lower bushings and series of sealing barriers in accordance with the teachings of the present invention.

Thus, the present invention provides a highly effective sealing arrangement for preventing fluid leakage around the valve stem of a high pressure control valve. The novel sealing arrangement of the invention is particularly effective in applications wherein the fluid to be controlled is a high temperature, high pressure fluid containing corrosive material, such as molten salt. The sealing arrangement includes several sealing barriers arranged in an axially spaced series to substantially prolong the amount of time required for the corrosive contents of the fluid to completely corrode and erode the sealing portions of the sealing arrangement. In addition, the invention provides several highly effective features to minimize and impede the exposure of the sealing barrier portions to the high temperature, high pressure fluid, as well as the corrosive contents thereof. In addition, if and when the fluid fully erodes the several sealing barriers, the sealing arrangement of the invention is readily repairable and/or replaceable in a minimal amount of time to greatly enhance and expand the on-line worklife of a high pressure control valve.

For a better understanding of the above and other features and advantages of the invention reference should be made to the following detailed description of preferred embodiments of the invention and to the accompanying drawings.

DETAILED DESCRIPTION OF PREFERRED EMBODIMENTS OF THE INVENTION

Figure 1:
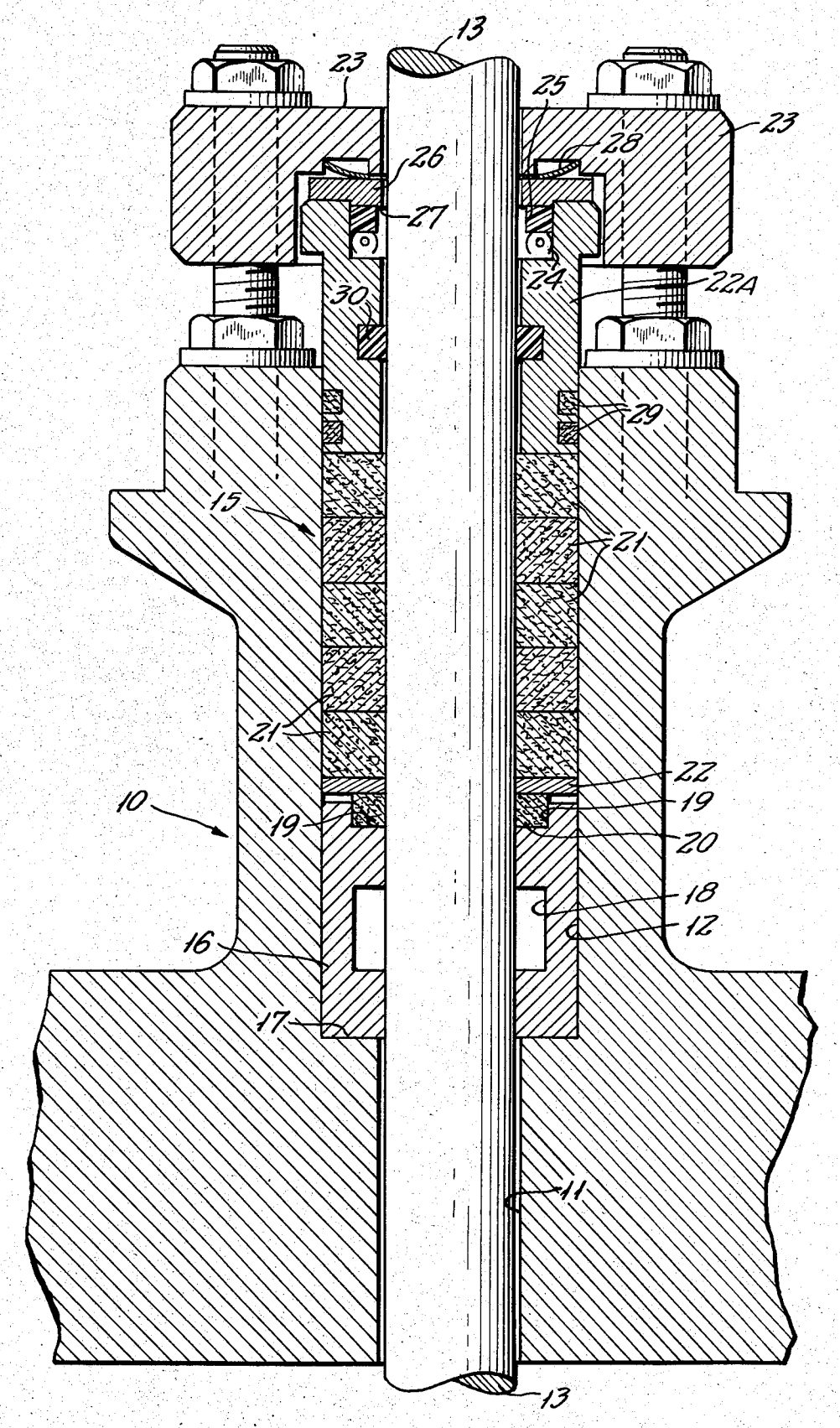
FIG. 1 is a side cross sectional view of the upper portions of a valve body, including a sealing arrangement built in accordance with the teachings of the present invention.

Referring now to the drawings, and initially to FIG. 1, the upper, valve stem support of a conventional valve body (not specifically illustrated) is designated by the reference numeral 10. The upper valve body 10 is provided with a cylindrical opening 11, including a portion of enlarged diameter 12. A valve stem 13 is received through the opening 11 and connected at its upper end to a valve actuator and at its lower end to a valve plug in accordance with well known, conventional high pressure fluid, control valve design (not specifically illustrated).

In accordance with the invention, a packing assembly 15 is mounted within the portion of enlarged diameter 12 to provide a leak tight seal between the valve stem 13 and upper valve body 10, whereby high pressure fluid flow through the valve may not leak out of the valve body around the outer diameter of the stem 13. The packing assembly 15 comprises a series of sealing barriers arranged to prevent leakage and to impede corrosion and erosion of the packing assembly 15, as will appear. As discussed above, the packing assembly 15 is particularly suitable for use in connection with the control of high temperature, high pressure fluids containing corrosive material, such as molten salt.

A basic design principle of the packing assembly 15 is to isolate the sealing barriers from direct exposure to the high temperature and full corrosive content of the controlled fluid flow. To that end, the lowermost portion of the packing assembly 15 comprises a bushing element 16 which is made from a corrosion and high temperature resistant material such as 3/16 stainless steel, inconel or 174 ph. The bushing element 16 is seated against a shoulder 17 defined by the lowermost end of the portion of enlarged diameter 12 of the opening 11 and is in a snug fit between the stem 13 and the internal walls of the opening 11, 17, 12. Accordingly, the bushing element 16 provides a first barrier to impede fluid flow from the spacing between the stem 13 and the opening 11. To advantage, the material of the bushing element 16 will not be readily adversely affected by the high temperature and corrosive action of the controlled fluid flow.

Pursuant to an important feature of the invention, an internal chamber 18 is formed within the bushing element 16 to provide an annular, open space around a portion of the stem 13, as clearly illustrated in FIG. 1. The internal chamber 18 defines a fluid reservoir, whereby any minimal, high pressure leakage between the bushing element 16 and stem 13 will expand into and accumulate within the chamber 18. The reservoir, fluid expansion effect results in several important advantages, as will appear. Initially, the chamber will cause an anti-pumping effect during valve opening operations. In other words, the upward movement of the stem 13 during valve opening will cause an upward displacement of the fluid surrounding the stem 13 within the opening 11. The upwardly displaced fluid may expand into and accumulate within the internal chamber 18 to thereby reduce the displacement pressure of the fluid resulting in a smoother valve opening operation. In addition, any solid particles which may be found within the fluid, such as solidifed salt, will drop out of the fluid and accumulate within the internal chamber 18 to prevent any abraisive action by such particles against sealing barriers arranged above the bushing element 16. Moreover, when the high pressure fluid leakage expands into the internal chamber 18, either during a valve opening operation or otherwise, the pressure drop caused by the expansion, as well as the reduced temperature of the fluid (to be discussed in greater detail below) will cause at least a portion of the corrosive content of the fluid to precipitate out of the fluid and accumulate within the internal chamber 18. Thus, if and when the upper sealing barriers of the packing assembly 15 are exposed to the fluid, the corrosive content of the fluid to which the barriers are exposed will be somewhat lower than the corrosive content of the main fluid flow due to the precipitating effect of the internal chamber 18.

An additional advantageous effect of the bushing element 16 is a temperature reduction in the fluid leakage. In the contemplated application for the invention, the main fluid flow may be at a temperature in excess of 1000° F. The temperature of the fluid leakage will gradually decrease by reason of heat dissipation through the upper valve body 10 as the fluid passes upwardly through the spacing between the valve stem 13 and the opening 11. The bushing element 16 provides additional spacing between the main fluid flow and the sealing barriers above the bushing element 16 of the packing assembly 15, whereby the temperature of the fluid leakage may decrease to the 500°–600° F. range before contacting any of the upper sealing barriers. Accordingly, the reduced temperature and reduced corrosive content of the fluid leakage caused by virtue of the structure and position of the bushing element 16 will significantly improve the operating environment to which the sealing barriers are exposed.

Referring once again to FIG. 1, a fluid seal seat 19 is formed about the uppermost portion of the inner diameter of the bushing element 16 to mount a fluid seal element 20 in a leak tight fit about the valve stem 13. As should be understood, the fluid seal element 20 will act as a sealing barrier to prevent any fluid leakage above the bushing element 16. Significantly, the seal element 20 will be exposed to a fluid which is at a substantially lower temperature and which contains a somewhat lower concentration of corrosive materials than the main fluid flow. Thus, the work life of the seal element 20 will be considerably longer than would be the case if the seal was exposed directly to the harsher characteristics of the main flow.

Above the bushing element 16 and seal element 20 is arranged an axial stack of several packing ring elements 21. Each of the ring elements 21 is in a leak tight fit between the stem 13 and inner surface of the portion 12 to provide a plurality of additional sealing barriers downstream from the seal element 20. A seal washer 22 is mounted between the seal element 20 and the axial stack of ring elements 21, whereby a more secure mounted fit is obtained between the components of the packing assembly 15.

To complete the structure of the assembly 15, a safety bushing 22A is received within the portion 12 and is compressed against the axial stack of ring elements 21, seal washer 22 and bushing element 16 by a gland follower 23. The gland follower 23 may be secured to the upper valve body 10 by any suitable conventional means, such as a screw bolt arrangement (not specifically illustrated).

Pursuant to an important feature of the invention, an annular recess 24 is formed about the uppermost portion of the inner diameter of the safety bushing 22 to mount a pressure activated safety seal 25. The safety seal 25 may comprise an Enerseal Mach One pressure activated seal manufactured by Advanced Products, Inc. A seal holder 26 is mounted upon the safety bushing 22 and includes a downwardly extending leg 27 to engage and affix the unactivated seal 25 within the annular recess 24. A leaf spring 28 is interposed between the gland follower 23 and seal holder 26 to provide a somewhat resilient application of compressive force by the gland follower 23 to the seal holder 26.

In accordance with the invention, the several ring elements 21 provide a series of sealing barriers above the seal element 20 and bushing element 16. Accordingly, as the corrosive contents of the fluid erode each sealing barrier, at the reduced rate of erosion resulting from the advantageous effects of the bushing element 16, the fluid leakage will encounter a further, series arranged sealing barrier. When and if all of the sealing barriers are eroded, the pressure of the fluid leakage will activate the safety seal 25. To advantage, the safety seal 25 is mounted in an easily accessible position, whereby the safety seal may be readily exposed and replaced to temporarily repair a valve after the seal 25 is eroded. Thus, the valve may be kept in operation and repaired at a time that is more convenient to the operator.

To further improve the sealing effectiveness of the packing assembly 15, a pair of static seals 29 is arranged about the outer perimeter of the safety bushing 22A to prevent any leakage from around the outer portion of the assembly 15. In addition, a wiper ring 30 is provided around the internal diamater of the safety bushing 22A'.

Figure 2:
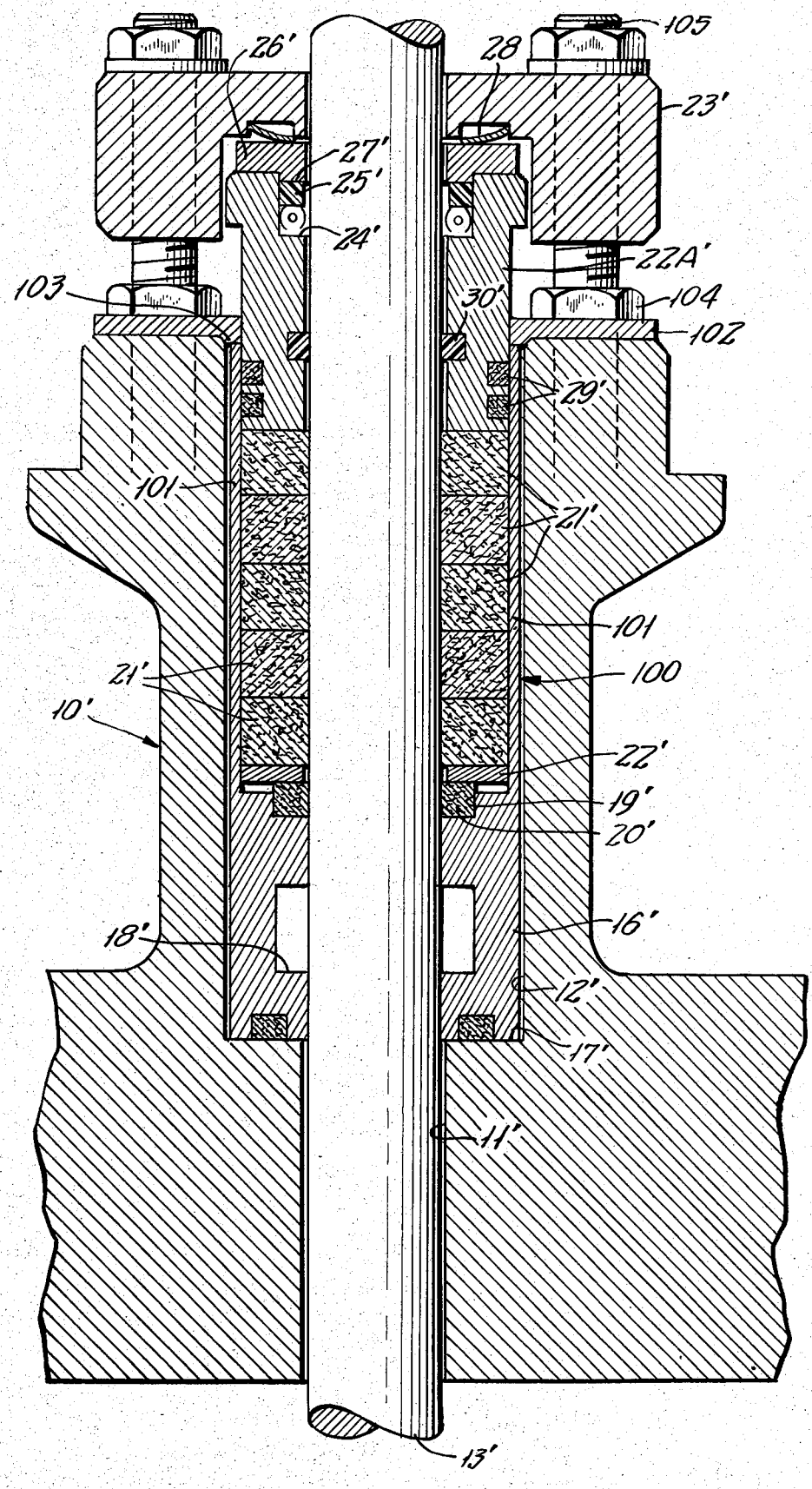
FIG. 2 is a side cross sectional view of the upper portions of a valve body illustrating an additional embodiment of the sealing arrangement of the present invention.

Referring now to FIG. 2, the teachings of the invention are advantageously incorporated into a cartridge assembly designated by the reference numeral 100. The cartridge assembly 100 is built generally in accordance with the packing assembly 15 of the embodiment of the invention illustrated in FIG. 1, and is mounted within a valve in a similar manner. For convenience, the primed reference numerals of FIG. 2 correspond to the unprimed reference numerals of FIG. 1 and reference should be made to FIG. 1 for a complete description of the structure and operation of the components of the cartridge assembly 100.

Pursuant to the invention, the cartridge assembly 100 comprises a packing assembly, as previously described, and further including an upwardly extending cylindrical sleeve 101 formed integral with the bushing element 16'. The sleeve 101 provides a housing for the seal element 20', seal washer 22', ring elements 21' and safety bushing 22A'. Accordingly, the entire packing assembly may be removed from the valve 10' by removing the housing formed by the bushing element 16' and integral sleeve 101. The cartridge arrangement of the invention, therefore, provides a highly convenient means for readily and quickly repairing a valve after erosion of the packing materials by the corrosive contents of the controlled fluid. The used cartridge 100 is simply removed from the valve and replaced by a new cartridge 100.

To advantage, the cartridge 100 is securely mounted in the valve 10' through the use of a ring-shaped cartridge compressor 102. The compressor 102 includes an inwardly projecting annular ring 103 which extends into the portion of enlarged diameter 12' to engage and compress the cartridge 100. The compressor 102 may be secured to the top of the valve 10' through a nut 104 and threaded bolt 105 also utilized to secure the gland follower 23'.

The present invention provides several significant features which effectively seal the stem of a high pressure control valve in a manner to minimize the deleterious effects of a high temperature fluid flow containing corrosive materials. The structural relationship between the various component parts of the invention operate efficiently to impede fluid leakage while acting to ameliorate the harsh effects of the fluid flow upon the sealing barriers. In this manner, the worklife of the sealing barriers is greatly extended to provide a seal having substantially improved operating characteristics in a harsh operating environment.

The above described embodiments of the invention are intended to be representative only, as certain changes may be made therein by those skilled in the art without departing from the clear teachings of the disclosure. Accordingly, reference should made to the following appended claims in determining the full scope of the invention.

I claim:

1. In a high pressure control valve including a valve body, an opening formed through said valve body and a valve stem extending through said opening, a packing assembly to form a leak tight seal between said valve stem and said opening, which comprises,
   (a) a lowermost bushing element comprising a heat and corrosion resistant material,
   (b) said bushing element including an internal fluid chamber arranged to form a fluid reservoir around a portion of said valve stem, whereby high pressure fluid leakage between the bushing element and the valve stem expands into and accumulates within the reservoir to provide an anti-pumping effect during valve opening operation and a precipitation of solid particles from the accumulating fluid,
   (c) a plurality of series arranged, axially stacked sealing barriers mounted above said lowermost bushing element, and
   (d) said reservoir accumulates solid particles therein during the movement of said valve stem to prevent the particles from reaching and deteriorating the sealing barriers.

2. The packing assembly according to claim 1, further characterized by said lowermost bushing element being made from stainless steal.

3. The packing assembly according to claim 1, further characterized by said lowermost bushing element being made from iconel.

4. The packing assembly according to claim 1, further characterized by said lowermost bushing element being made from 174 ph.

5. The packing assembly according to claim 1, further characterized by
   (a) an uppermost safety bushing arranged in an axially spaced relation above said lowermost bushing element and compressing said sealing barriers between the safety bushing and the lowermost bushing element, and (b) a gland follower being arranged to apply a compressive, mounting force to said uppermost safety bushing.

6. The packing assembly according to claim 5, further characterized by a pressure activated seal mounted by said uppermost safety bushing about said valve stem.

7. The packing assembly according to claim 6, further characterized by (a) an annular recess being formed at the inner diameter of the uppermost portion of said safety bushing, and (b) said pressure activated seal being mounted within said annular recess.

8. The packing assembly according to claim 1, further characterized by (a) an annular recess being formed within said lowermost bushing element, and (b) a seal element being mounted within said annular recess in a leak tight seal around said valve stem, (c) said seal element being positioned above said internal fluid chamber.

9. In a high pressure control valve including a valve body, an opening formed through said valve body and a valve stem extending through said opening, a packing assembly to form a leak tight seal between said valve stem and said opening, which comprises, (a) a plurality of series arranged, axially stacked sealing barriers, (b) a safety bushing arranged above said axial stack of sealing barriers for compressing said sealing barriers and at an uppermost portion of the opening for easy access from the exterior of the valve body, and (c) a pressure activated seal mounted by said safety bushing about said valve stem and at a portion of the safety bushing readily accessible from the exterior of the valve body whereby the pressure activated seal may be readily exposed and replaced, (d) whereby, in the event fluid leaks above said axial stack of sealing barriers, the fluid pressure will activate the pressure activated seal to form a safety seal around the valve stem and the easy access to the pressure activated seal facilitates a temporary valve repair by exposure and replacement of the pressure activated seal without removing any other elements of said control valve.

10. The packing assembly according to claim 9 further characterized by (a) a gland follower being arranged to apply a compressive mounting force to said safety bushing, (b) an annular recess being formed at the inner diameter of the uppermost portion of said safety bushing, (c) said annular recess being arranged immediately below said gland follower and, (d) said pressure activated seal being mounted within said annular recess.

11. In a high pressure control valve including a valve body, an opening formed through said valve body and a valve stem extending through said opening, a packing assembly to form a leak tight seal between said valve stem and said opening, which comprises, (a) a plurality of series arranged, axially stacked sealing barriers, and (b) a cartridge element being arranged and configured to house and enclose each of said sealing barriers, (c) whereby said cartridge element and enclosed sealing barriers comprise an integral unit to thereby provide a means to easily remove and replace all of said series arranged, axially stacked sealing barriers at one time by removing and replacing the cartridge element, and (d) said cartridge element includes a lowermost bushing element having an internal fluid chamber arranged to form a fluid reservoir around a portion of said valve stem, whereby high pressure fluid leakage between the bushing element and the valve stem expands into and accumulates within the reservoir to provide an anti-pumping effect during valve opening operation and a precipitation of solid particles from the accumulating fluid, said reservoir accumulates the solid particles therein during the movement of said valve stem to prevent the particles from reaching and deteriorating the sealing barriers.

12. The packing assembly according to claim 11, further characterized by a bushing element being integrally formed with said cartridge element at the lowermost portion of said cartridge element.

13. The packing assembly according to claim 12, further characterized by said bushing element including an internal fluid chamber arranged to form a fluid reservoir around the valve stem.

14. The packing assembly according to claim 13, further characterized by (a) a safety bushing being received within the upper portions of said cartridge element above said enclosed sealing barriers, and (b) a pressure activated seal being mounted by said safety bushing about said valve stem.

15. In a high pressure control valve for high temperature fluid flow including a valve body, an opening formed through said valve body and a valve stem extending through said opening, a packing assembly to form a leak tight seal between said valve stem and said opening, which comprises, (a) a bushing element forming the lowermost portion of said packing assembly, (b) said bushing element having a predetermined height dimension, (c) a plurality of series arranged, axially stacked sealing barriers mounted within an upper portion of said bushing element and being spaced above the lowermost end portion of said packing assembly by said bushing element by at least the predetermined height dimension of said bushing element, said bushing element and said sealing barriers can be easily removable as a single unit for repair purpose (d) said predetermined height dimension being set at a value whereby high temperature fluid leakage around the bushing element will undergo a substantial temperature reduction due to absorption of heat by said bushing element prior to contact with said plurality of series arranged, axially stacked sealing barriers.

16. The packing assembly according to claim 15, further characterized by said bushing element including an internal fluid chamber arranged to form a fluid reservoir around said valve stem.

* * * * *